March 14, 1961 E. D. DAMMERT ET AL 2,974,811
WORK HANDLING MECHANISM
Filed Sept. 20, 1957 4 Sheets-Sheet 4

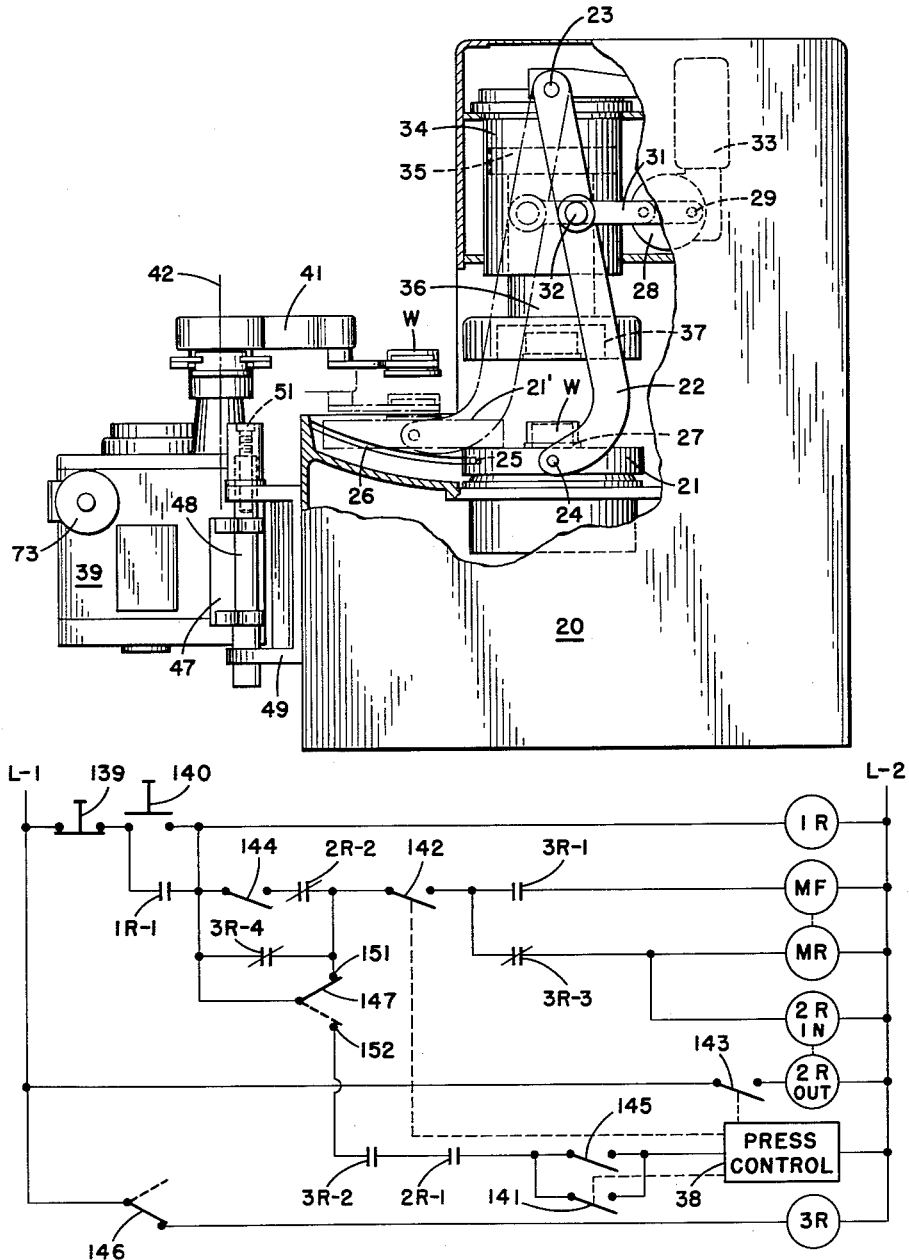

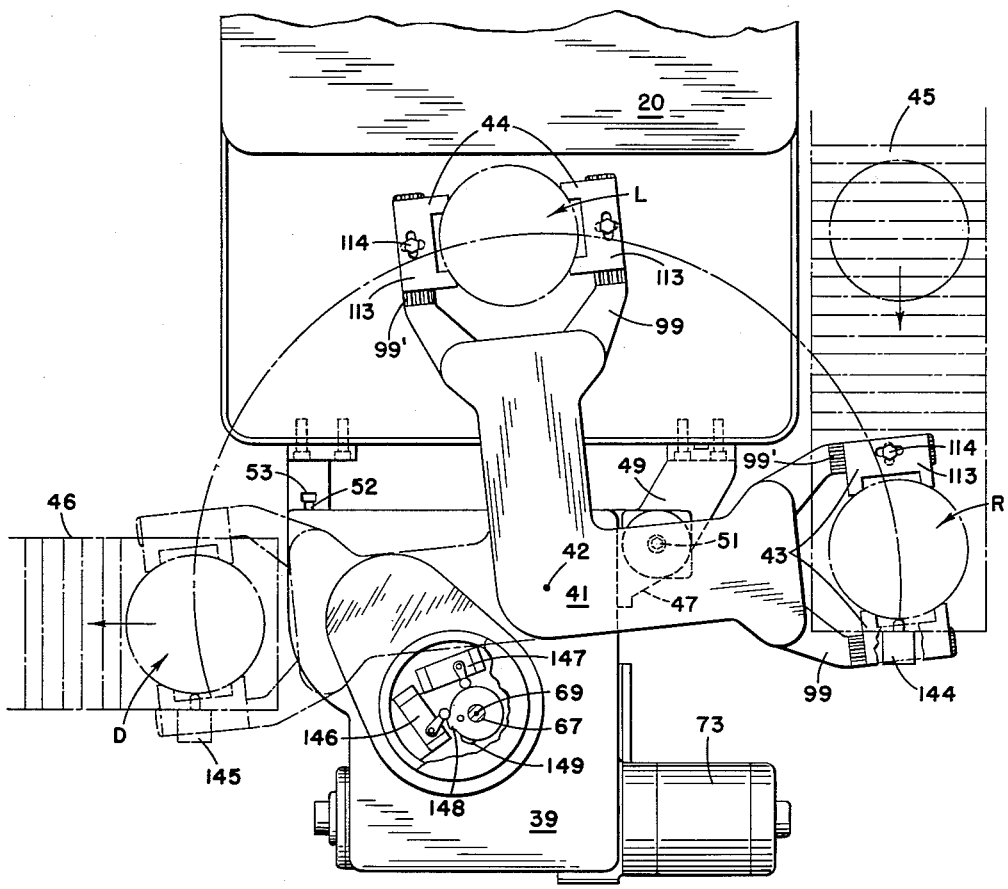
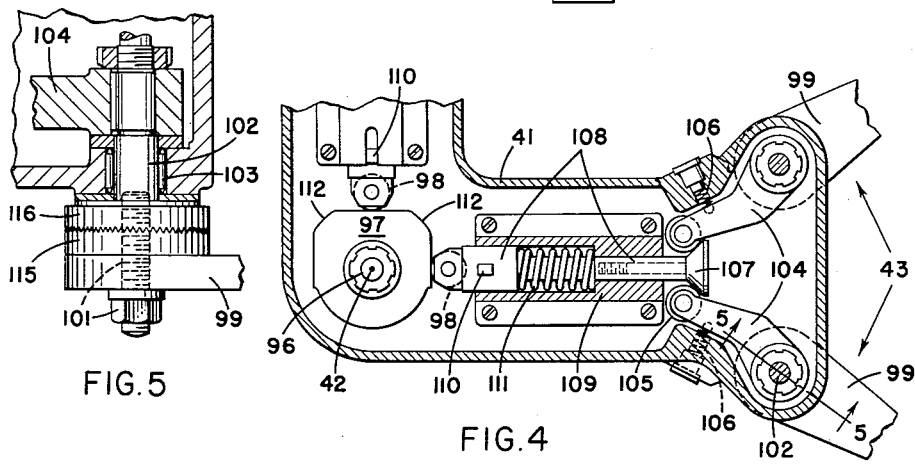

United States Patent Office 2,974,811
Patented Mar. 14, 1961

2,974,811

WORK HANDLING MECHANISM

Earl D. Dammert, Webster, and Myron F. De Wolf, Penfield, N.Y., assignors to The Gleason Works, Rochester, N.Y., a corporation of New York Filed Sept. 20, 1957, Ser. No. 685,266

13 Claims. (Cl. 214—1)

The present invention relates to a work handling mechanism for gripping a workpiece in one position, transporting it to another position, and there releasing it. The mechanism is adapted especially, but not exclusively, for a gear quenching press.

The underlying objectives are the provisions of a simple, compact and durable mechanism which is primarily mechanical, and hence positive and certain in operation, and which will perform the loading and unloading operations with great rapidity.

According to one aspect of the invention the mechanism comprises a support, a work engaging jaw carried by the support, a cam mounted for angular oscillation on the support, and a reversing motor for oscillating the cam, said cam having a track with separate paths for respectively opening and closing the jaws, said paths each comprising a dwell section which at one end merges into an active section and at the opposite end forms an acute juncture with the active section of the other path.

According to another aspect of the invention the mechanism comprises a support, a work transfer member having a work-gripping device and being mounted on the support for angular oscillation and also for reciprocation along the axis of oscillation, a drive member and a driven member journaled in the support for angular oscillation, the drive member having a pin for driving engagement in a radial slot in the driven member, such that during an angular motion of the drive member the pin will enter the slot and move the driven member angularly and then depart from the slot, a motion-transmitting connection between the driven member and the work transfer member, a reversing motor arranged to oscillate the drive member through a greater angle than that in which the pin is engageable in the slot, means operable by said motor for effecting reciprocation of the transfer member in time with the terminal portions of each oscillation of the drive member occurring before and after engagement of the pin in the slot, and means operable in response to the drive member being brought to opposite terminal positions of its oscillation for causing said work-gripping device to respectively grip and release a workpiece.

Because the drive member oscillates through a larger angle than is required for oscillating the transfer member, the mechanism is greatly simplified in two ways. First, a reversible motor may be employed since the exact position at which the motor reverses does not affect the terminal position of the transfer member. Secondly, the drive member can be geared or otherwise positively connected to an oscillating cam which in the terminal phases of its motion, after the angular motion of the transfer member has stopped, moves the transfer member vertically and actuates the work-gripping jaws.

The foregoing and other objects and advantages will appear more fully from the following description of the preferred embodiment of the invention shown in the accompanying drawings, wherein:

Fig. 1 is a side view of the quenching press and work handling mechanism, with parts of the press broken away;

Fig. 2 is a diagram of the electrical control system for the mechanism;

Fig. 3 is a plan view of a part of the structure appearing in Fig. 1;

Fig. 4 is a plan sectional view through one arm of the work transfer member;

Fig. 5 is a detail vertical section in the plane designated 5—5 in Fig. 4;

Figure 6:
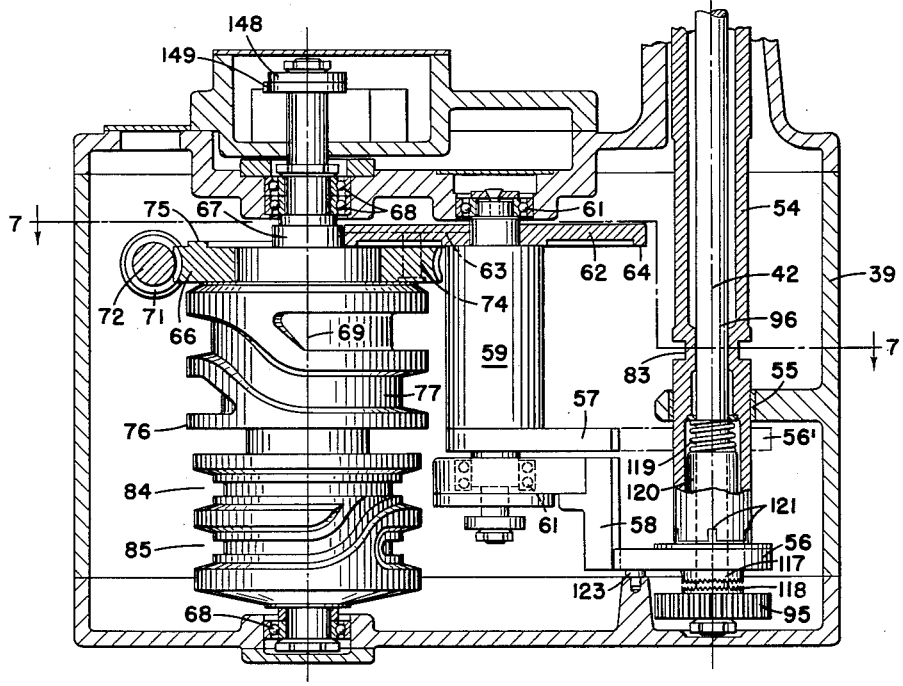
Fig. 6 is a vertical section through the operating mechanism for the transfer member, taken approximately in the planes indicated by the broken section line 6—6 of Fig. 7.

The press shown in Fig. 1 is substantially like that described and claimed in Patent No. 2,494,984. It comprises a frame 20 on which a work support 21 is mounted for movement between a work station, in which the support appears in full lines, and a loading station in which it appears in broken lines at 21'. The work support is carried by a pair of links 22, one of which is behind the other in Fig. 1, and which both are pivoted to the frame on axis 23 and to the support on axis 24. The support also has on each side a guide roller 25, these rollers riding in arcuate guideways 26, one of which is on each side of the frame. On the support is mounted a lower die 27 for seating the workpiece W to be quench-hardened, in this case a roller bearing race. The links 22 are oscillated about pivot axis 23, to carry the support between its work station and its loading station, by means of a crank 28. The crank pin, 29 is connected to one link 22 by a pitman 31, and a pivot pin 32 connects the pitman to the link. The crank is rotated by a motor and reduction gear unit 33.

Also supported on frame 20 is a cylinder 34 in which a piston 35 is reciprocable, the piston being a part of a ram 36 to which an upper die 37 is secured. The ram is raised and lowered by differential fluid pressures applied to the bottom and top of the piston. When lowered the ram clamps a workpiece between the upper and lower dies. While it is so clamped it is quenched by a liquid coolant circulated by suitable apparatus, not shown.

The press further includes control means for, in properly timed sequence, causing operation of the motor of unit 33 to move the work support 21 between its loading and working positions, application of fluid pressure to piston 35 for lowering and raising the ram 36, and circulation of quenching fluid around the workpiece W. These control means, which may be of the kind covered by aforementioned Patent No. 2,494,984, are not a part of the present invention and hence are illustrated only schematically, being shown in Fig. 2 as comprising a unit 38 having certain switches associated therewith, as will be described later.

The work handling mechanism includes a support comprising a housing 39 secured to frame 20 and a work transfer member 41 mounted on the support for angular movement about an upright axis 42 and also for motion along that axis. The transfer member is of generally L-shape in plan and has two sets of work-engaging jaws, respectively designated 43 and 44. The two sets of jaws are at the same radial distance from axis 42 and are spaced angularly about it. As shown in full lines in Fig. 3, when the set of jaws 44 is at the loading station L, i.e. vertically aligned with the lower die 27 on the support 21 in its loading position 21', the other set of jaws, 43, is at a receiving station R. When the transfer member is moved counterclockwise to its broken line position in Fig. 3, the jaws 43 are thereby brought to the loading station L and the jaws 44 to a delivery station D. An endless chain conveyor 45, or other suitable conveyor, may bring each workpiece W to the receiving station R where it is grasped by jaws 43, then lifted by raising of the transfer member along its upright axis 42, then swung to station L and lowered onto the die 27. Simultaneously with the foregoing sequence a quenched workpiece on the die 27 at station L is grasped by jaws 44, lifted and swung to station D where it is lowered onto another endless chain, 46, or other suitable conveying device.

The support 39 includes a bracket 47 affixed to an upright pin 48 which is pivotally and slidably received in a bracket 49 affixed to frame 20. By means of a screw 51 the pin may be slid vertically in bracket 49 during the set up of the machine, to thereby adjust the height of the work handling unit 39, 41, to suit the particular design of the workpieces. The pivotal connection 48, 49 enables the work handling unit to be swung about the axis of pin 48 away from frame 20 to provide access to the quenching press proper, to facilitate changing or adjusting the dies 27, 37 and for other purposes. However before being put into operation the work handling unit is secured against such pivotal motion by means of a screw fastener 52, Fig. 3, having an enlarged head engaged in a vertical T-slot 53 in a bracket on the frame 20.

Figure 7:
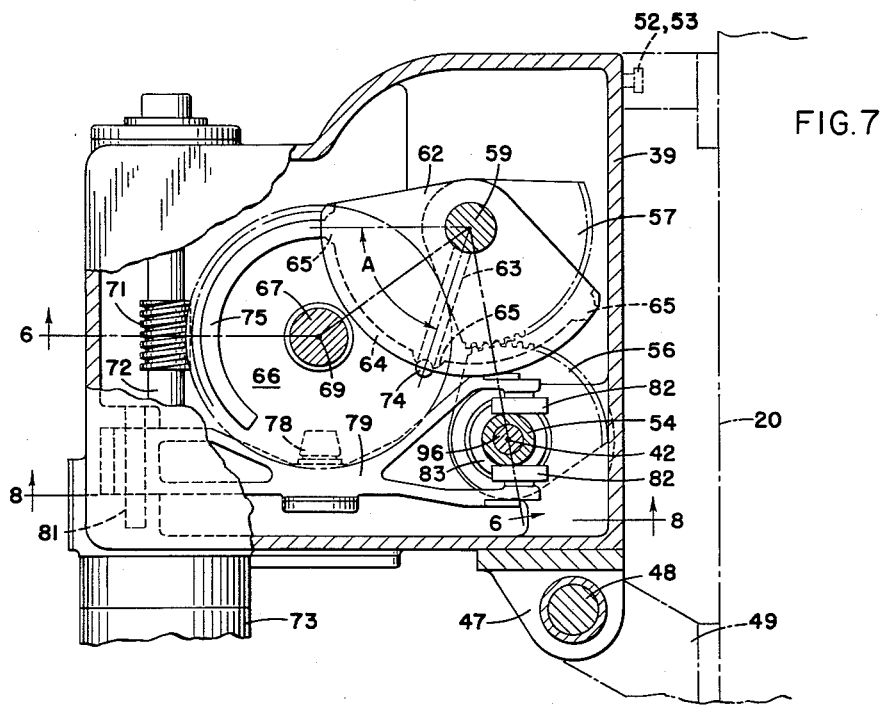
Fig. 7 is a plan section taken approximately in the planes indicated by broken section line 7—7 of Fig. 6.
Figure 8:
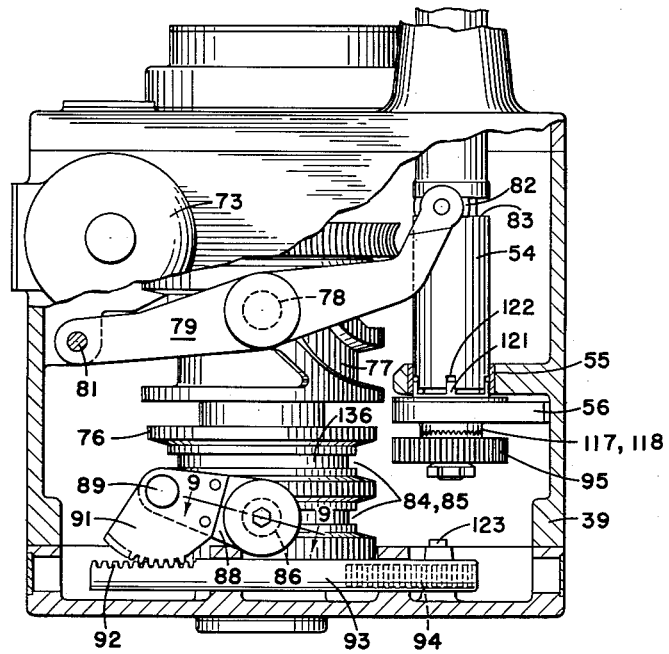
Fig. 8 is a vertical section approximately in the planes of broken section line 8—8 of Fig. 7.

The transfer member 41 has an upright tubular shaft 54, Figs. 6 to 8, journaled in two vertically spaced bearings in the support 39 for angular motion about axis 42 and also for vertical motion along that axis. The lower one of these bearings is shown at 55. For effecting the angular motion a segmental gear 56 which is non-rotatable relative to shaft 54 is adapted to mesh with another segmental gear 57 when the transfer member (including shaft 54) is raised to bring gear 56 to dotted line position 56' in Fig. 6. At all times when the gear 56 is out of mesh with gear 57, i.e. whenever the transfer member is lowered from its uppermost position, gear 56 meshes with a rack 58 which is affixed to support 39, thereby holding the transfer member against angular motion. Gear 57 is secured to a shaft 59 that is journaled in bearings 61 for rotation in support 39, the shaft having also secured thereto a segmental plate 62. This plate has a radial slot 63 and a peripheral flange 64 which has three notches 65 cut therethrough.

The plate 62 constitutes the oscillatory driven member of a Geneva-type movement whose driver is a worm wheel 66. This wheel is affixed to a shaft 67 journaled in the support 39 on bearings 68 for oscillation about upright axis 69. The wormwheel is oscillated by a worm 71 provided on a horizontal shaft 72 that is driven by a reversing electric motor 73. Associated with the motor is a brake which quickly stops shaft 67 when the motor is deenergized. On each swing of oscillation of the wormwheel a drive pin 74 carried by it enters the slot 63, turns the plate 62 through angle A in Fig. 7, and then leaves the slot. As the pin leaves the slot, at the end of each swing of oscillation of the wormwheel, an arcuate rib 75 on the wormwheel enters one of the notches 65 in flange 64, to hold plate 62 against motion. On each swing, the rib leaves the notch at the moment the pin 74 enters the slot. As is characteristic of Geneva-type movements, the drive pin 74 is always at the point of tangency between its arcuate path and the radial direction of the slot at the moment it enters and departs from the slot, with the result that the driven member, plate 62, is on each swing accelerated smoothly from a standstill to maximum angular velocity and then is smoothly decelerated to a standstill. The gearing 57, 56, by which this angular motion is imparted to the transfer member, is of such ratio that for motion of plate 62 through angle A the transfer member is swung through the angle necessary to carry a workpiece from station R to station L, or from station L to station D. In the illustrated embodiment this is an angle of 90°. The wormwheel 66 oscillates through approximately 360° so that the pin 74 has a substantial angular motion after it leaves the slot 63 on each swing.

For raising and lowering the transfer member 41 a drum cam 76 on shaft 67 is provided with a cam track 77 in which is engaged a follower roller 78, Figs. 7 and 8. The roller is carried by a lever 79 fulcrumed by pivot pin 81 to the support 39. The distal end of the lever is bifurcated and has pivoted thereto a pair of bearing blocks 82 which seat in an annular groove 83 in the shaft 54 of the transfer member.

Figure 9:
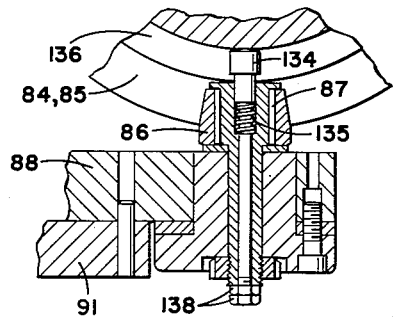
Fig. 9 is a detail section taken in plane 9—9 of Fig. 8.

For actuating the jaws 43, 44, there is a cam track having separate forward and return paths, 84 and 85. This cam track is engaged by a follower roller 86, Figs. 8 and 9, mounted on antifriction bearing 87 on a lever 88 which is fulcrumed to the support 39 by pivot pin 89. Affixed to this lever and co-axial with pin 89 is a segmental pinion 91 meshing with teeth 92 on one end of a rack 93 that is slidable lengthwise in the support. The opposite end of the rack has teeth 94 which mesh with a gear 95 when the transfer member is in its lowermost position, this gear being affixed to the lower end of a shaft 96 which is rotatable within tubular shaft 54 but is immovable relative thereto in an axial direction. On the upper end of shaft 96 is a cam 97 which is located within the transfer member and engages two follower rollers 98, one for each set of jaws 43, 44. Each jaw is carried by an arm 99 secured by a threaded stud and nut 101, Fig. 5, to a pivot shaft 102 which is journaled on an anti-friction bearing 103 in the transfer member. Affixed to each shaft 102 within the transfer member is an arm 104 carrying a roller 105. Springs 106 urge jaw-opening pivot motion of each arm assembly 99, 102, 104 and thereby hold the two rollers 105 of each set against a conical cam 107 which is integral with a stem 108 that carries the related follower roller 98. Each stem is slidable radially of axis 42 in a guide 109 on the transfer member. A spring 111 acts between the stem and the guide to retain the roller 98 against cam 97, and, by shifting the cam 107 radially inwards when permitted by this cam, closes the jaws. A key 110 on stem 108 engages in a keyway in guide 109 to hold the cam and roller assembly 107, 98 against rotation.

To effect closing of the jaws the cam track 84, 85 swings the lever 88 counterclockwise in Fig. 8, moving the rack 93 to the right from position there shown. This rotates the gear 95 and the cam 97 counterclockwise to the position shown in Fig. 4. In this position the spring 111 has overpowered the lighter springs 106 and has moved the cam 107 toward axis 42, thereby closing the jaws. To open the jaws the lever 88 is swung clockwise in Fig. 8 by the cam, moving the rack 93 to the left and the cam 97 clockwise in Fig. 4, whereupon lobes 112 of cam 97 move radially outwards the follower and cam assemblies 98, 107 of both sets of jaws, thereby allowing the springs 106 to open the jaws.

The jaws themselves, designated 113, may be adjusted on the arms 99 in a direction lengthwise of serrations 99', i.e. approximately radial of axis 42, and also in a direction transverse of the serrations, after first loosening fastening screws 114. Also each arm 99 may be adjusted angularly relative to its pivot shaft 102, Fig. 5, after first loosening nut 101 to thereby allow separation of a toothed clutch part 115 of the arm from a mating clutch part 116 of shaft 102. By these adjustments the jaws can be made to accommodate workpieces W of different diameters.

The gears 56 and 95 have mating face clutch teeth 117, 118. Whenever the gear 95 is disengaged from rack teeth 94, i.e. whenever the transfer member is raised, these clutch teeth are engaged, as shown in Fig. 8. Such engagement is effected by a compression spring 119, Fig. 6, which acts between a shoulder in shaft 54 and the tubular shank 120 of gear 56 to urge the latter downwardly on the shaft. In all positions the gear 56 remains non-rotatable relative to the shaft 54 by reason of splines 121 on its shank slidably engaging in mating recesses 122 in the lower end of the shaft. Whenever the transfer member approaches its lowermost position, Fig. 6, the bottom face of gear 56 abuts a stop button 123 on the support 39. This arrests the downward motion of gear 56 and causes a separation of clutch teeth 118 of gear 95 from the mating teeth 117 of gear 56. Gear 95 is then free for rotation relative to the transfer member is response to the motion of rack 93.

Figure 10:
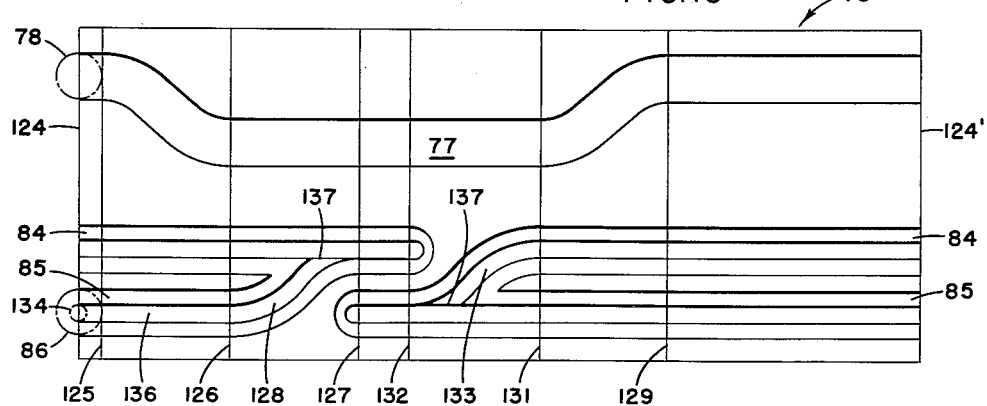
Fig. 10 is a plane development of the cylindrical cam employed to move the transfer member vertically and to actuate its work engaging jaws.

The relationship between the motions of the transfer member and actuation of the jaws will now be described with reference particularly to Fig. 10. The transfer member normally stops in the angular position shown in Fig. 3. It is also raised because follower roller 78 is approximately in the position relative to the cam represented by line 124 of Fig. 10; and the jaws are open because the follower roller 86 is also in position 124 and in the lower or return cam path 85. This position is also shown in Fig. 8. In operation, the cam is first turned by the motor in a clockwise direction in Fig. 7, i.e. to the left in Fig. 10, to bring the follower rollers first to relative position 125 and then to positions 126 and 127. At 125 the drive pin 74 leaves slot 63. Between positions 125 and 126 the track 77 lowers the roller 78 and also the transfer member, and thereby brings gear 95 into mesh with rack 93. Between positions 126 and 127 the active part 128 of path 85 raises roller 86, thereby shifting rack 93 to the right and closing the jaws. Jaws 43 close on a fresh workpiece at station R; jaws 44 close upon a quenched workpiece at station L. The motor now reverses and the cam 76 is moved counterclockwise, or to the right in Fig. 10. The jaws remain closed because roller 86 now remains in return path 84, but between positions 126 and 125 the roller 78 and the transfer member are raised; at position 125 the drive pin 74 enters slot 63 and by position 124 (or 124' at the right of Fig. 10) the pin is starting to move the plate 62 clockwise. The transfer member is moved counterclockwise in Fig. 3, through the now meshing gears 57, 56. At position 129 the pin leaves the slot; jaws 43 are at station L and jaws 44 at station D. Between positions 129 and 131 the cam track 77 effects lowering of the transfer member; and between positions 131 and 132 the active portion 133 of cam path 84 is effective to lower the roller 86 to open the jaws, thereby releasing the fresh workpiece at station L and the quenched workpiece at station D. The motor now again reverses, and drives the cam 76 through successive positions 131, 129 to position 124' (or 124). In the latter position it stops to await quenching of the workpiece deposited at station L. Between positions 131 and 129 the transfer member is raised; between 129 and 124' it is returned to the position shown in Fig. 3, or nearly so. Meanwhile the jaws have remained open, for roller 86 follows return path 85.

To force the roller 86 to follow the paths 84 and 85 in the manner described above, it is, as shown in Fig. 9, provided with a guide pin 134 backed by a spring 135, the pin following grooves 136 in the bottom of the cam track 84, 85. These grooves become progressively shallower in the active sections 128 and 133 of the cam track, being of minimum depth at the downstream ends of these sections, so that whenever the roller 86 passes from section 128 into path 84, or from section 133 into path 85, the pin 134 passes over an edge 137 into a deep part of the grooves. This prevents return of the follower into the active section 128 or 133 from which it has just departed. Nuts 138 on pin 134 act as a stop to prevent the pin from contact with the bottoms of grooves 136 except in the shallow parts thereof.

For controlling the machine the apparatus shown in Figs. 2 and 3 is provided. This apparatus includes push button type stop and start switches, 139 and 140, connected in series with a relay 1R across leads L–1 and L–2, these leads extending from a suitable source of electrical energy. Relay 1R has contacts 1R–1 which are closed only when the relay is energized. The apparatus also includes a motor controller having forward and reverse windings, MF and MR, which when energized respectively cause forward and reverse operation of the motor; a two-position or latch relay 2R having windings 2R–IN and 2R–OUT, contacts 2R–1 which close when winding 2R–IN is energized and remain closed until opened by energization of winding 2R–OUT, and contacts 2R–2 which are closed whenever contacts 2R–1 are open; and a relay 3R having contacts 3R–1 and 3R–2 which are closed only when the relay is energized and contacts 3R–3 and 3R–4 which are closed only when it is deenergized. A normally open switch 141 is closed by the press control unit 38 as soon as the latter is energized and remains closed until the unit is deenergized. A normally open switch 142 is held closed by the unit 38 whenever the lower die support is in position 21', and a normally open switch 143 is momentarily closed when the unit 38 reaches the end of its cycle, i.e. at the moment when switch 141 is closed. A switch 144 is opened only when a workpiece is at station R on the conveyor 45; and connected in series with unit 38 is a similar switch 145, which shunts switch 141 and is closed only when a workpiece is on conveyor 46 at station D. Mounted on support 39 are two switches 146 and 147 controlled respectively by cams 148 and 149 affixed to shaft 67. Switch 146 is closed by cam 148 as the latter approaches the terminal position of its clockwise motion (in Fig. 3) and is opened when the cam reaches its terminal position of its counterclockwise motion. Switch 147 is moved to close its contact 151 as the cam 149 moves beneath it in a clockwise direction and is moved to close its contact 152 as the cam moves beneath it in the opposite direction; it remains in each position until shifted by the cam to the other position.

The machine is started by momentarily closing switch 140 and operation continues until the stop switch 139 is opened or until the conveyor 45 fails to deliver a workpiece to station R on time or there is a failure of the transfer mechanism to deliver a workpiece from station L to station D. Upon closing of start switch 140 the relay 1R is energized and, because contacts 1R–1 close, remains energized until stop switch 139 is opened. Assuming that the work handling mechanism has previously stopped in its normal stop position, i.e. with the transfer member raised and with jaws 43 at station R, the cam 148 will have previously closed switch 146, so that relay 3R is energized. Contacts 3R–1 and 3R–2 are closed, and contacts 3R–3 and 3R–4 are opened. Relay 2R is out so that contact 2R–2 is closed. Assuming also that the press has stopped in its normal stop position, in which switch 142 is closed, that there is a workpiece on support 21 at station L, and that switch 144 is closed by a workpiece on the conveyor 45 at station R, the controller winding MF is energized immediately, causing forward operation of motor 73, i.e. motion of cam 76 from position 124 to position 127 in Fig. 10, thus lowering the transfer member and closing the jaws on the workpieces at stations R and L. At position 127 (which is the position of Fig. 3) the cam 148 opens switch 146 and thereby deenergizes relay 3R. The resulting opening of contacts 3R–1 and closing of contacts 3R–3 causes deenergization of winding MF, and energization of MR, so that the motor now operates in reverse, raising the transfer member, swinging it counterclockwise, and then again lowering it and opening the jaws. During this operation the cam 149 passes beneath switch 147, closing it against contact 152. This, however, is without effect since contacts 3R-2 are open and contacts 3R-4 (shunting open contact 151) are closed. Because of this closure of 3R-4 the removal of the workpiece from station R, opening switch 144, is also without effect. Simultaneously with energization of winding MR the latch relay 2R is put in, closing contacts 2R-1 and opening contacts 2R-2 without immediate effect. When position 132 is reached the cam 148 closes switch 146, thereby energizing relay 3R. The resulting closing of contacts 3R-1 and opening of 3R-3 deenergizes winding MR and energizes MF, for switch 147 is at this time closed against contact 151. Upon energization of MF, motor 73 operates to raise the transfer member and swing it back to the position wherein jaws 43 are at or near station R. In this position, 124 of Fig. 10, the cam 149 operates switch 147 to open contact 151, thus opening the circuit of the motor controllers because at this time switch 144 is open, another workpiece on conveyor 45 having not yet reached station R. Also contacts 2R-2 and 3R-4 are open. Consequently the motor 73 stops in the position wherein cam 149 holds switch 147 against contact 152. This closes the circuit through now closed contacts 3R-2 and 2R-1, and switch 145 (closed by the workpiece deposited at station D), and press control unit 38. This unit closes the switch 141 (so that switch 145 may now open without effect). As the die support 21 starts to move in to its working position the switch 142 opens. At the conclusion of the quenching cycle, when the die support returns to its loading position 21', switch 142 is closed and held closed, and switch 143 is momentarily closed to put out latch relay 2R. This opens contacts 2R-1 and thus deenergizes the circuit for the unit 38 and causes switch 141 to open. Contacts 2R-2 are closed. Therefore, provided that a fresh workpiece on conveyor 45 now recloses switch 144, the forward motor controller MF is energized and the entire cycle described above is automatically repeated.

Having now described the preferred embodiment of the invention, and its operation, what is claimed is:

1. A work handling mechanism comprising a support, a transfer member mounted on the support for angular oscillation and for reciprocation along the axis of oscillation, work engaging jaws on the transfer member and actuating means therefor including a first gear element movable on the support and a mating gear rotatable on but axially immovable relative to the transfer member, means for oscillating the transfer member including a second gear element movable on the support and a mating gear axially movable on but non-rotatable relative to the transfer member, said gears having clutch teeth for holding them against relative rotation and spring means for urging relative axial motion of them to maintain engagement of said clutch teeth, said gear elements respectively meshing with said gears in opposite terminal positions of reciprocation of the transfer member, a rack fixed on the support for meshing with the gear that is non-rotatable relative to transfer member when the last-mentioned gear is out of mesh with said second gear element, and a stop on the support for arresting the axial motion of the last-mentioned gear, to thereby effect disengagement of said clutch teeth, when the gear rotatable on the transfer member is brought into mesh with said first gear element at the end of one stroke of reciprocation of the transfer member.

2. A mechanism according to claim 1 in which said first gear element is a rack, there is an oscillating cam and a reversing drive motor therefor, said cam being arranged for reciprocating said rack and also for reciprocating the transfer member, and said second gear element is a gear segment oscillated by said motor in time with oscillation of the cam.

3. A work holding mechanism comprising a support, work engaging jaws carried by the support, a cam mounted for angular oscillation on the support, and a reversing motor for oscillating the cam, said cam having a track with separate paths for respectively opening and closing the jaws, said paths each comprising a dwell section which at one end merges into an active section and at the opposite end forms an acute juncture with the active section of the other path.

4. A mechanism according to claim 3 in which there is a follower actuated by the cam and connected to the jaws for actuating the same, the cam and the follower having cooperating formations thereon for compelling the follower to alternately follow one and then the other of said separate paths as the cam oscillates back and forth.

5. A work handling mechanism for gripping a workpiece in one position, transporting it to another position, and there releasing it, comprising a support, a work transfer member having a work gripping device and being mounted on the support for angular oscillation and also for reciprocation along the axis of oscillation, a drive member and a driven member journaled in the support for angular oscillation, the drive member having a pin for driving engagement in a radial slot in the driven member, such that during an angular motion of the drive member the pin will enter the slot and move the driven member angularly and then depart from the slot, a motion-transmitting connection between the driven member and the work transfer member, a reversing motor arranged to oscillate the drive member through a greater angle than that in which the pin is engageable in the slot, means operable by said motor for effecting reciprocation of the transfer member in time with the terminal portions of each oscillation of the drive member occurring before and after engagement of the pin in the slot, and means operable in response to the drive member being brought to opposite terminal positions of its oscillation for causing said work-gripping device to respectively grip and release a workpiece.

6. A mechanism according to claim 5 in which the last-mentioned means comprises a cam driven by said motor in unison with said drive member.

7. A mechanism according to claim 5 in which said motion-transmitting connection comprises a gear on said driven member and a mating gear on the transfer member, said gears being moved out of mesh during each reciprocation of the transfer member, and a rack on the support for meshing with said mating gear when the latter is out of mesh with the gear on said driven member.

8. A mechanism according to claim 5 in which said means operable by said motor comprises a cam driven by the motor, said cam having a dwell portion effective while the pin is engaged in the slot and active portions on each side of the dwell portion, said active portions being effective to reciprocate the transfer member during both terminal portions of each oscillation of the drive member.

9. A mechanism according to claim 8 in which the cam and the drive member are connected to oscillate as a unit.

10. A mechanism according to claim 8 in which the transfer member has a pair of work-gripping jaws thereon which constitute said work-gripping device, and in which there is the means for causing said device to respectively grip and release a workpiece includes a track on said cam for opening and closing said jaws in time with the reciprocations of the transfer member.

11. A work handling mechanism comprising a support, a transfer member mounted on the support for angular oscillation, said member having a pair of work-gripping jaws thereon, a drive member and a driven member mounted on parallel axes in the support, the drive member having a pin for driving engagement in a radial slot in the driven member, a reversible motor for oscillating the drive member, and a motion transmitting connection between said driven member and the transfer member, whereby during a portion of each swing of oscillation of the drive member the transfer member is moved through one swing of oscillation during which it is gradually accelerated from a standstill to a maximum velocity and then gradually decelerated to a standstill, a cam movable as a unit with the drive member and means operated by said cam for reciprocating the transfer member along its axis of oscillation in time with oscillation of the drive member, one such reciprocation occurring after each stroke of oscillation of the transfer member, means including a track on said cam for opening and closing said jaws in time with the reciprocation of the transfer member, the last-mentioned means further including a rack reciprocated by said track on the cam, a gear carried by and rotatable on the transfer member by the rack, said gear being moved into and out of meshing engagement with the rack by the reciprocation of the transfer member, and means for holding said gear against rotation relative to the transfer member when the gear is out of engagement with the rack.

12. A work handling mechanism comprising a support, a transfer member mounted on the support for angular oscillation, said member having a pair of work-gripping jaws thereon, a drive member and a driven member mounted on parallel axes in the support, the drive member having a pin for driving engagement in a radial slot in the driven member, a reversible motor for oscillating the drive member, and a motion transmitting connection between said driven member and the transfer member, whereby during a portion of each swing of oscillation of the drive member the transfer member is moved through one swing of oscillation during which it is gradually accelerated from a standstill to a maximum velocity and then gradually decelerated to a standstill, a cam movable as a unit with the drive member and means operated by said cam for reciprocating the transfer member along its axis of oscillation in time with oscillation of the drive member, one such reciprocation occurring after each stroke of oscillation of the transfer member, and means including a track on said cam for opening and closing said jaws in time with reciprocations of the transfer member, said track having separate forward and return paths each comprising a dwell section which at one end merges into an active section and at the opposite end forms an acute juncture with the active section of the other path.

13. A mechanism according to claim 12 in which there is a follower actuated by the cam and connected to the jaws for actuating them, the follower and the cam having cooperating formations thereon for compelling the follower to alternately follow one and then the other of said separate paths as the cam oscillates back and forth.

References Cited in the file of this patent

UNITED STATES PATENTS

| | | |
|---|---|---|
| 300,871 | Kaiser | June 24, 1884 |
| 1,163,169 | Pavelka | Dec. 7, 1915 |
| 1,619,729 | Howard | Mar. 1, 1927 |
| 1,766,574 | Westin | June 24, 1930 |
| 2,010,703 | Slade et al. | Aug. 6, 1935 |
| 2,494,984 | Bauer | Jan. 17, 1950 |
| 2,520,252 | Mutchler | Aug. 29, 1950 |
| 2,589,486 | Emrick | Mar. 18, 1952 |
| 2,692,693 | Newburg | Oct. 26, 1954 |
| 2,811,267 | Bock | Oct. 29, 1957 |